United States Patent [19]
Seiden et al.

[11] 3,774,512
[45] Nov. 27, 1973

[54] TWIN LENS CAMERA OPTICAL SYSTEM ADJUSTMENT MODULE

[75] Inventors: Myron A. Seiden, Needham; Charles A. Barr, Waltham, both of Mass.

[73] Assignee: Polaroid Corporation, Cambridge, Mass.

[22] Filed: Jan. 3, 1972

[21] Appl. No.: 214,637

[52] U.S. Cl. ............... 95/18 R, 95/12.2, 95/59
[51] Int. Cl. ............................... G03b 35/10
[58] Field of Search ..................... 95/18, 12.2

[56] References Cited
UNITED STATES PATENTS

| | | | |
|---|---|---|---|
| 2,869,446 | 1/1959 | Franceschini | 95/18 |
| 3,504,607 | 4/1970 | Bok | 95/18 |
| 1,051,591 | 1/1913 | Huebner | 95/12.20 |
| 1,398,952 | 11/1921 | Tessier | 95/12.20 |
| 3,381,598 | 5/1968 | Starp | 95/59 |

Primary Examiner—John M. Horan
Attorney—Brown & Mikulka and Robert L. Berger

[57] ABSTRACT

In the double optical system of a twin lens camera, a control device including a single interceptor unit for adjustably varying the size of the exposure apertures of both optical systems. In such a system a control device including a single interceptor unit for inserting filters into both of such optical systems. As useful in such inserter control device, an overcenter spring with one end operated in an arc. A module combining such control devices and such overcenter spring.

12 Claims, 9 Drawing Figures

PATENTED NOV 27 1973 3,774,512

TWIN LENS CAMERA OPTICAL SYSTEM ADJUSTMENT MODULE

This invention relates to the optical systems of twin lens cameras and has particular reference to devices for altering the operational characteristics of such systems by adjustment of elements thereof. As one example, it relates to forming and adjusting iris apertures. As another example, it relates to insertion and removal of light filters in and from such systems. As a further example, it relates to a unique overcenter spring structure for positive action in such alteration.

PRIOR ART

Various forms of structures for varying iris and filter elements of camera systems are found in U.S. Patent Office classification, Class 95, subclasses 1.1, 18 and 64R
Class 350, subclasses 315 and 318
Class 352, subclasses 57, 58, 59, 60 and 62

One Pat., No. 3,442,194 illustrates an iris adjustment scissors form for a single optical system.

Another Pat., No. 2,869,446 shows iris aperture change by means of a rotating disc with different size pairs of holes, serving a pair of optical systems. A pair of scissor blades are shown as a shutter mechanism.

A further Pat., No. 1,321,705 shows a disc for color photography, with different filters and iris aperture registerable in a single lens system.

SUMMARY OF THE INVENTION

In photographic situations in which it is useful to operate a pair of twin optical systems, it is desirable in view of modern day needs, to provide photographic structure which is simple and sure in operation, and compact and unitized in structure. These needs are felt particularly in the sense of treating each of a pair of systems identically and simultaneously.

One example of use of such systems is in the production of identification photographs, in particular in the production of a number of such photographs from a single sheet of film.

This invention provides one form of such photographic structure in a device for forming and adjusting a pair of iris apertures simultaneously to duplicate sizes and size changes by means of a single adjustment device or system. This device includes a pair of crossed blades, pivoted and operable in scissor form and manner to simultaneously form and adjust each of a pair of iris apertures, one in each lens system. Special gear segments on a circle periphery of each such blade are coupled to a single gear train which is manually operable to thus adjust the iris apertures of both optical systems in the same manner and degree, and at the same time.

This invention provides a feature which assures precise duplication of such twin iris apertures and adjustments and also enables the iris structure to be made inexpensively. This is accomplished by making the iris blades identical in form and dimension, each having a circular main body and hook like arm extensions with edge cut outs each to form half an aperture. In assembly, one blade can be turned over end for end. Thus manufacturing tolerances need not be tight because errors are compensated by the reversal of one of a pair of duplicate blades.

Another form of such photographic structure in this invention is a disc device, pivoted for such rotation as to insert duplicate filter elements simultaneously in each of twin optical systems. This device is manually operated, through gearing to provide shuttle movement to insert and remove such filters. In conjunction with this device, an overcenter spring is used to provide snap action and spring bias holding in each of two rotary positions of the filter disc. This spring is essentially S shape to enable it to function compactly in a small area, while yet embodying substantial thrust and stroke.

This invention also provides a unique and useful modular combination of the above elements and features. This module can include a full complement of photographic lenses for each of twin photographic optical systems. The module thus is a unitary structure not limited to use in any one specific photographic system.

It is, therefore, an object of this invention to provide new and useful iris structure in a twin lens photographic structure.

Another object of this invention is to provide new and useful filter structure in a twin lens photographic structure.

A further object of this invention is to provide a new and useful snap action structure exemplified in use by a twin lens filter change system.

Still another object of this invention is to provide a photographic twin lens modular unit incorporating the features of the above recited objects in a compact and simple structure.

Other objects and advantages of this invention will be in part apparent and in part pointed out hereinafter and in the accompanying drawings, wherein.

Figure 6:
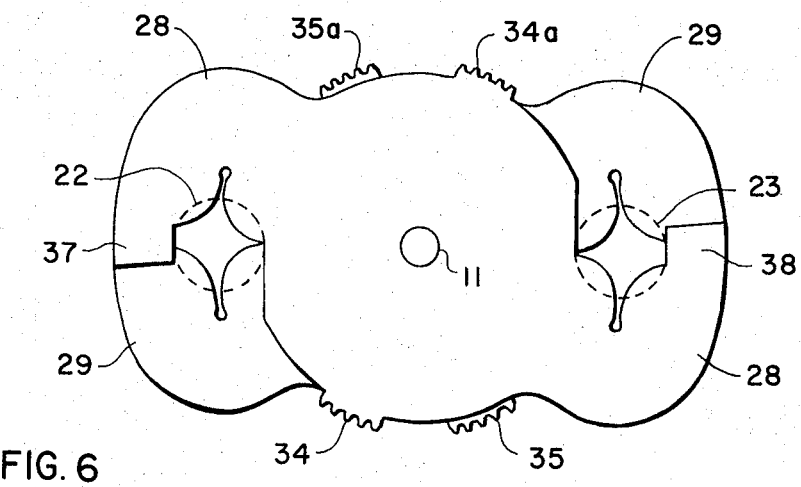
Figure 7:
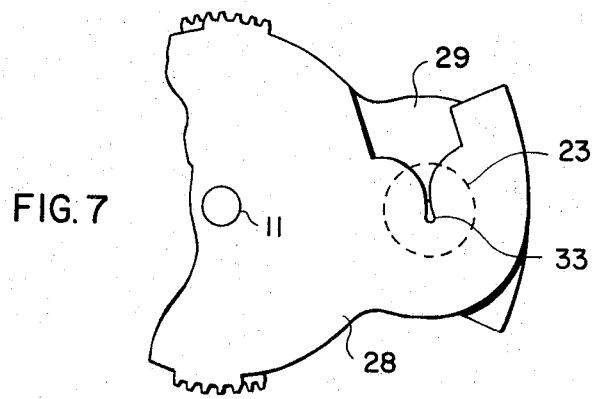
Figure 5:
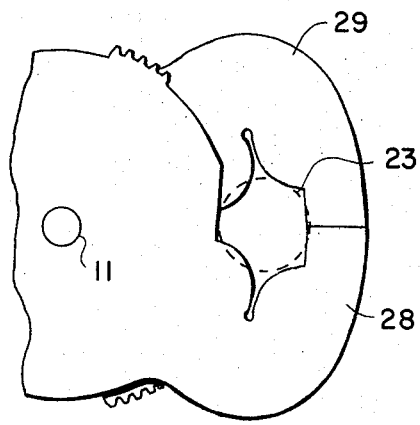
Figure 8:
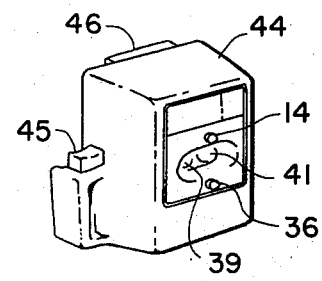
Figure 9:
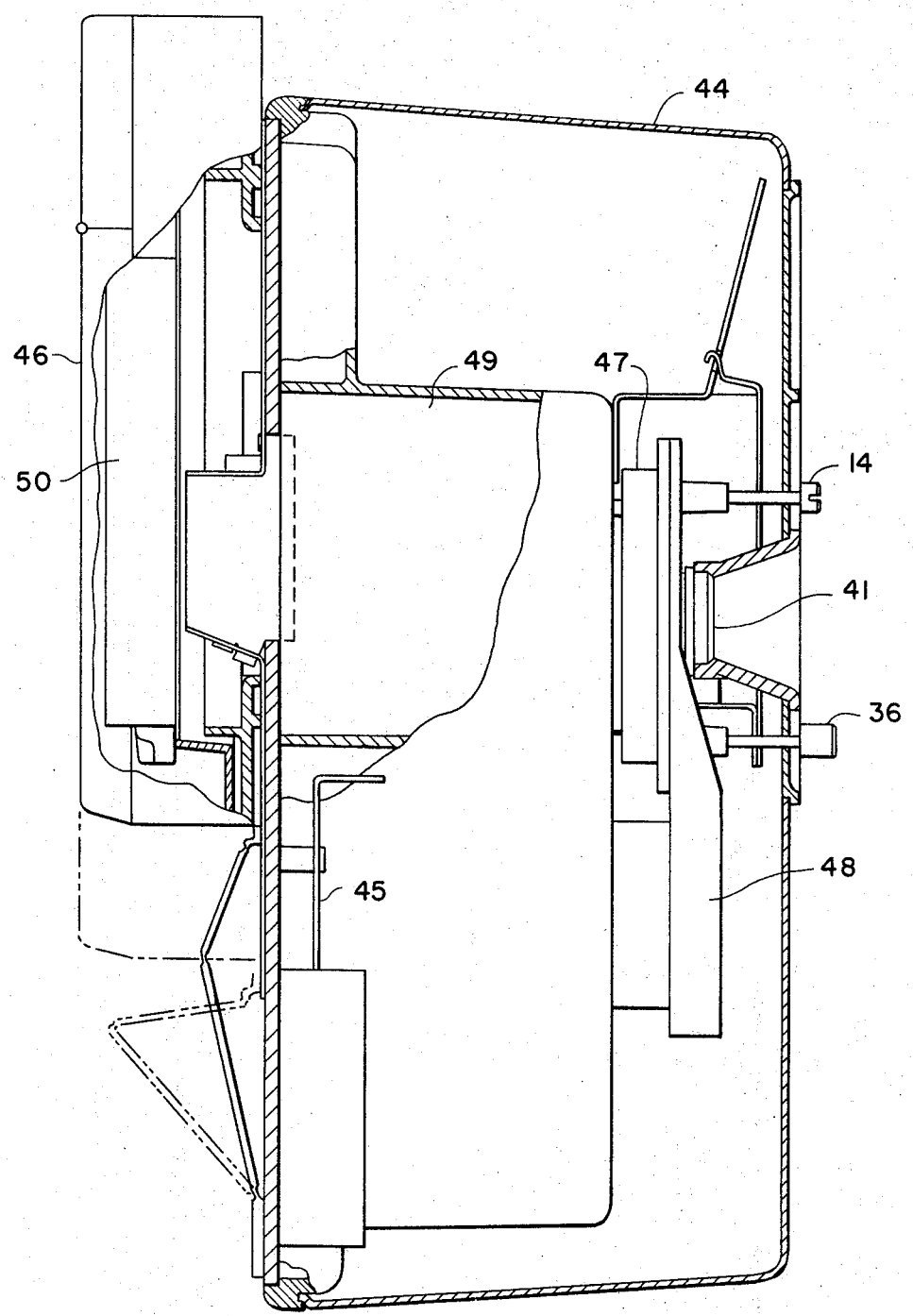

FIGS. 5, 6, and 7 are illustrations of iris aperture adjustment blades according to this invention in increments adjustment of the iris aperture according to this invention;

FIG. 8 is an outer form perspective of a twin lens camera embodying this invention; and FIG. 9 is a showing of the general interior of the camera of FIG. 8.

This invention is embodied in a twin lens twin optical system module for a camera, and such a module in combination with a camera. The camera may be one having a sliding back. Thus, this invention may be involved in a system for producing two or more photographs from a single sheet of film.

The module of this invention is mounted in a panel opening in the front of a camera. It comprises, in general, a pair of side-by-side optical systems. A pair of scissor blade forms is provided as an iris forming and adjusting structure for both such optical systems simultaneously. Further, a filter disc is provided as a means, for simultaneous insertion of filter members in both of such optical systems.

The above, and associated structure, is detailed hereinafter.

Figure 1:
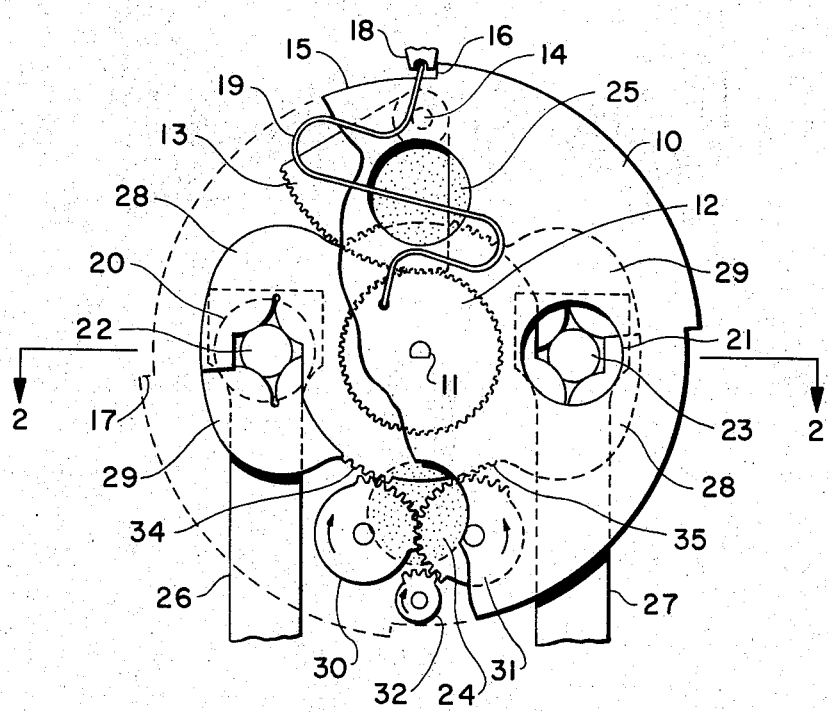
FIG. 1 is an inner face showing of an iris and filter module according to this invention, partly cut away.
Figure 3:
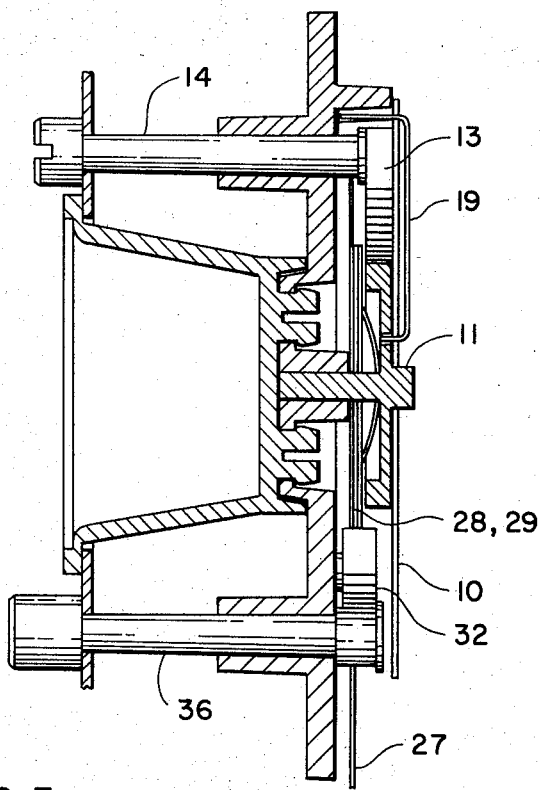
FIG. 3 is a section of the structure of FIGS. 1 and 2, taken essentially on line 3—3 of FIG. 2.
Figure 4:
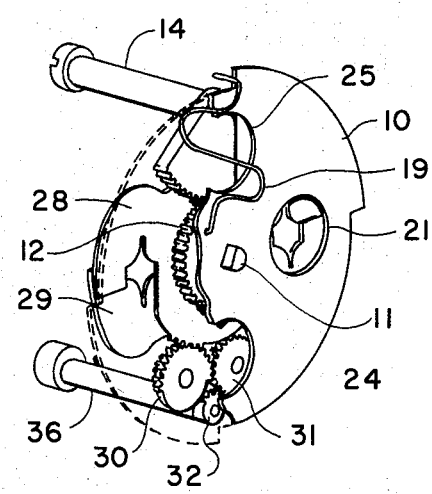
FIG. 4 is a cut away perspective as a further illustration of the structure of FIGS. 1-3.

In FIG. 1, the internal face of a filter disc 10 is shown. It is mounted on and for rotation by, a central shaft 11. A filter gear 12 is mounted on the shaft 11 and secured to the filter disc 10. A sector gear 13 is meshed with the upper periphery of the filter gear 12, and is mounted on a rotatable filter disc operating shaft 14. The filter disc 10 has peripheral cutout portions, for example, at 15. The abutments thus formed at 16 and 17 are engaged with an external stop 18 to define two rotary positions of the filter disc 10, 90° apart.

This rotary movement of the filter disc 10 is back and forth in the 90° arc. The movement is initiated by manual rotary actuation of the filter shaft 14. An overcenter spring 19, in both directions of movement of the filter disc, at first opposes such manual movement. Past the center of the arc of movement the spring acts in aid of the manual movement to snap the disc in the direction of such movement, and continues a spring bias of the disc against the stop after the disc reaches either of its two positions.

The overcenter spring 19 has one end secured to the stop 18 and the other end secured to the filter gear 12 at a point away from the central shaft 11 and near the periphery of the filter gear 12. Accordingly, as the filter disc is rotated, one end of the spring 19 is pivotedly fixed at the stop 18 and the other end of the spring is pivotally extended through the filter gear 12. Thus, this other spring end travels in an arc radial to the filter gear 12 as the filter disc is rotated. The spring 19 is formed essentially in an S shape to enable its operation within the confines of the module, and to provide both compression and expansion capabilities suitable to the arcuate movement required of it in a rotary acting device. The double loop of the S form is a means of achieving compactness of design and of distributing the compression and expansion functions of the spring.

The filter disc is provided with four openings in a circle, and 90° apart. Two of these openings 20 and 21 are on a first diameter of the filter disc. These are empty openings, without filters. As shown, these two openings each overlie one of a pair of mask openings 22 and 23 in the optical systems of the module of the device of this invention. The other two openings 24 and 25 are on a second diameter of the filter disc, perpendicular to the first diameter. The openings 24 and 25 have selected, identical filters therein. Upon rotation of the filter disc 90° by operation of the filter disc actuator shaft 14, the filters used in openings 24 and 25 are moved into place over the mask openings 22 and 23.

As part of the camera operating system, in FIG. 1, a pair of shutters 26 and 27 are operated up and down from below in a suitable manner to wholly intercept the optical systems light paths through the mask apertures 21 and 22. These shutters are simple, solid, interceptor strips with no openings therethrough.

Further in FIG. 1, there is a crossed blade system for scissor movement to form and adjustably vary an iris aperture in each of the optical systems of this structure as represented by mask openings 22 and 23. These blades are indicated at 28 and 29, and are mounted on the shaft 11 as a mid-point pivot for both of the blades, and in the area of their mutual intersection. The iris blades 28 and 29 are operated by means of a gear train comprising segment gears 30 and 31 as driven by a manually operated segment pinion gear 32. This blade structure and operation is shown in further detail in FIGS. 4, 5, 6, and 7.

The operation of the blades 28 and 29 is shown in increments from full open, with respect to mask opening 23, in FiG. 5; to partially open, in FIG. 6; to minimum opening 33 in FIG. 7. Such adjustment can be made in any suitable number of steps, for example, from F-8 on down in five stops.

Each of the blades 28 and 29 is provides with peripheral segments of gear teeth as at 34 on blade 28 and 35 on blade 29. Thus, blade 28 is rotated to close the iris, counterclockwise by the gear train 32, 31, 30, and 34. Blade 29 is simultaneously and oppositely rotated by the gear train 32, 31, and 35. The pinion segment 32 is manually rotated, for such adjustment by manual rotation of a shaft 36 on which the segment 32 is mounted.

The general configuration of each of the iris blades, for example blade 28, is a circular thin body with the gear segment 34 on one side of the periphery of the circle. The gear segment 34 is thus on a radial arc. On one diameter of the circle form, the blade 28 extends radially outward at both ends of the diameter to form oppositely disposed hook-like forms 37 and 38 which provide essentially half of the iris aperture for each lens system.

In one form of this invention, the blades 28 and 29 can be made identical in form and dimension, so that one of the blades need only be turned over to provide an opposite, matching blade for one not so turned over. This provides highly useful manufacturing simplification and cost reduction. In such case, it is only necessary, on each blade, to form a second, opposite peripheral gear segment such as 34A or 35A for blade 29. In an assembly of such identical blades, only one of such segments on each of the blades, will be in use.

Figure 2:
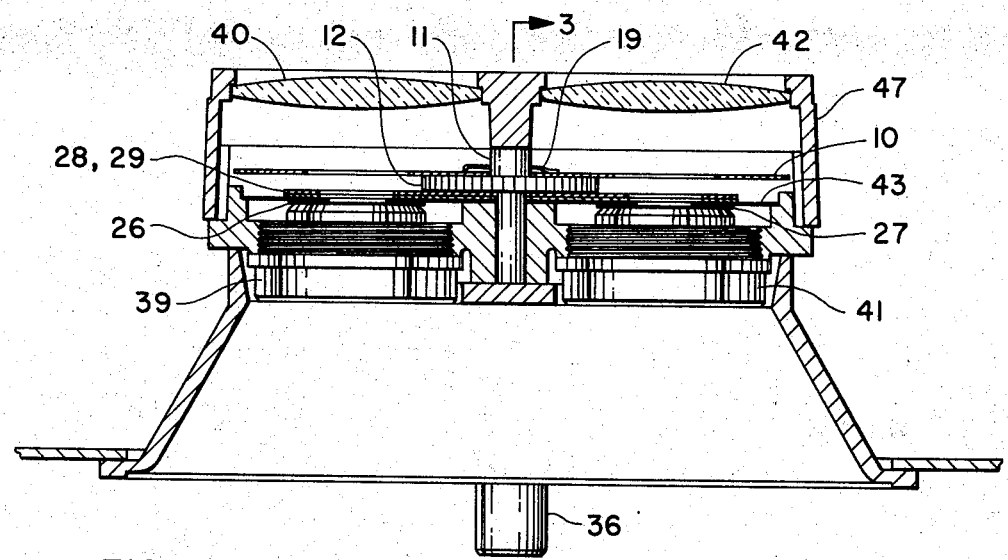
FIG. 2 is a section of the structure of FIG. 1 as if it were whole, taken essentially on line 2—2 of FIG. 1.

In FIG. 2, the modular construction of the device of this invention is shown, with a pair of lens systems of a lens unit 39 and a lens 40, and a lens unit 41 and a lens 42, with the filter disc 10 and iris blades 28 and 29 lying between the lens units 39 and 41 and their inner lenses 40 and 42. A mask 43 is also shown, in which the FIG. 1 openings 22 and 23 are formed.

The external view, FIG. 8, of a camera embodying this invention, includes a main housing 44 in which the module of this invention is mounted as indicated by the twin lens units 39 and 41. An operating button 45 is shown on a handle, and a back member 46 is partially shown.

FIG. 9 shows some internals of the camera of FIG. 8. A housing 47 essentially encompasses the module of this invention, see also FIG. 2. Support elements 48 are used to support and guide the shutters 26 and 27, (FIG. 1). A septum 49 is used to separate the twin optical systems one of which is represented by lens units 41. A film pack 50 is mounted in a sliding back 46 which may be moved up and down to present different areas of a film sheet in the film pack, to the optical systems.

The module of this invention may be incorporated in a twin lens, sliding back, identification photograph camera, in a similar camera system or in any camera system utilizing twin, adjacent, optical systems.

The module is adjusted by turning the pinion 32 to set both the iris apertures at a desired F stop or aperture area. This is accomplished simultaneously, and essentially identically in both optical systems by adjusting the iris blades 28 and 29 about the mounting shaft 11. As a pivot, and by using the gear trains 32, 30, and 32, 31.

Also, the filter disc 10 is rotated by turning the gear segment shaft 14 to rotate the gear 12 and consequently the disc 10. The filter disc affords a choice as between a pair of selected essentially identical filter elements as at 24 and 25, and a pair of open spaces, as at 20 and 21. If desired, instead of the open spaces being empty, filter elements different from those at 24 and 25 may be used.

This invention, therefore, provides a new and useful module for quick, simple, and sure operation of a twin lens camera system, with unique means for forming and adjusting iris apertures in each of the optical systems of a two lens system, for inserting light filters in each such system, and for spring movement of such filters by means of a unique overcenter spring and assembly.

As many embodiments may be made of the above invention and as changes may be made in the embodiment set forth above without departing from the scope of the invention, it is to be understood that all matter hereinbefore set forth and in the accompanying drawings is to be interpreted as illustrative only and not in a limiting sense.

We claim:

1. An optical system module for use in a twin lens camera system, comprising:
   a pair of lens systems;
   a pivot shaft mounted between said lens systems and parallel thereto;
   a pair of iris blades, cross mounted on said pivot shaft for scissor adjustment to variably form an iris aperture in both of said lens systems;
   a first gear system coupled to said iris blades for accomplishing said adjustment;
   a filter disc, also mounted on said pivot shaft for rotation thereon between two positions at one of which a filter is inserted into both of said lens systems;
   a second gear system for rotating said filter disc; and
   an S shaped overcenter spring connected to snap and bias said filter disc into said two positions thereof.

2. A camera system comprising:
   a pair of optical systems each defining an optical path;
   means for forming an iris aperture in each of said optical paths, including a blade unit extending transversely of both of said optical paths;
   means for mounting said blade unit for adjustment to vary the size of both of said apertures by moving said blade to intercept said optical paths in accordance with said adjustment;
   means for selectively inserting light filter means simultaneously into both of said optical paths;
   said inserting means including a pivoted disc with a pair of filters therein, one such filter on each side of the pivot of said disc, along a diameter of said disc; and
   said inserting means further including an overcenter spring mounted generally radially on said disc for snapping and biasing said disc into position with said filters in said optical paths.

3. A camera system according to claim 2, wherein:
   said blade unit is a pair of crossed blades; and
   said mounting means is a pivot in the area of intersection of said crossed blades.

4. A camera system according to claim 2, wherein:
   said blade mounting means is a pivot; and
   means is provided for accomplishing said adjustment by engaging a peripheral portion of said blade unit to move at least a part of said blade unit about said pivot.

5. A camera system according to claim 2, wherein:
   said blade unit mounting is a pivot; and
   means is provided for accomplishing said adjustment, including a gear tooth form of coupling with a peripheral portion of said blade unit.

6. A camera system according to claim 2, wherein:
   said blade unit is a pair of crossed blades;
   said mounting means is a pivot in the area of intersection of said crossed blades; and
   said crossed blades are essentially identical with each other.

7. A camera system according to claim 2, wherein:
   said blade unit is a pair of crossed blades;
   said mounting means is a pivot in the area of intersection of said crossed blades;
   said crossed blades are essentially identical with each other; and
   each of said blades having two edge cut out forms as part of said iris apertures, and peripheral gear formation as part of means for accomplishing said movement of said blade unit.

8. A camera system according to claim 2, wherein:
   said blade unit is a pair of crossed blades;
   said mounting means is a pivot in the area of intersection of said crossed blades;
   said crossed blades are essentially identical with each other;
   each of said blades having a circular body centered at said pivot, a gear form on the circle periphery and a pair of extensions one at each end of a diameter of said body;
   each of said extensions having an edge cut out form as part of one of said iris apertures; and
   said cut out forms opening laterally from said diameter, on opposite sides of said diameter, and oppositely with respect to each other.

9. A camera system according to claim 2, wherein:
   said blade unit is a pair of crossed blades;
   said mounting means is a pivot in the area of intersection of said crossed blades;
   said crossed blades are essentially identical with each other;
   each of said blades having a circular body centered at said pivot, a pair of gear forms on the circle periphery, one such gear form at each end of a first diameter of said body, and a pair of extensions one at each end of a second diameter of said body;
   each of said extensions having an edge cut out form as part of one of said iris apertures; and
   said cut out forms opening laterally from said diameter, on opposite sides of said diameter, and oppositely with respect to each other.

10. A camera system comprising:
    a pair of optical systems, each defining an optical path; and
    means for selectively inserting light filter means simultaneously into both of said optical paths;
    said inserting means including a pivoted disc with a pair of filters therein, one such filter on each side of the pivot of said disc, along a diameter of said disc; and
    said inserting means further including an overcenter spring mounted generally radially on said disc for snapping and biasing said disc into position with said filters in said optical paths.

11. A camera system comprising:
    a pair of optical systems, each defining and optical path; and means for selectively inserting light filter means simultaneously into both of said optical paths;
said inserting means including a pivoted disc with a pair of filters therein, one such filter on each side of the pivot of said disc, along a diameter of said disc;
said inserting means additionally comprising an overcenter spring;
said spring having one end secured to a fixed stop on a radius of said disc and outwardly beyond said disc, and the other end secured to said disc at a point spaced from said disc pivot.

12. A camera system comprising:
a pair of optical systems, each defining an optical path; and
means for selectively inserting light filter means simultaneously into both of said optical paths;
said inserting means including a pivoted disc with a pair of filters therein, one such filter on each side of the pivot of said disc, along a diameter of said disc;
said inserting means additionally comprising:
an overcenter spring as a part of said inserting means;
said spring being mounted generally radially on said disc for snapping and biasing said disc into position with said filters in said optical paths; and
said spring, in unattached and at rest condition having a shape generally in the form of an S.

* * * * *